United States Patent
Oslejs et al.

(10) Patent No.: US 9,284,225 B2
(45) Date of Patent: Mar. 15, 2016

(54) COMPOSITE CONCRETE FOR FLOOR SLABS AND RAFTS

(75) Inventors: Janis Oslejs, Riga (LV); Kaspars Kravalis, Riga (LV)

(73) Assignee: Primekss Rabine North America LLC, Schaumburg, IL (US)

( * ) Notice: Subject to any disclaimer, the term of this patent is extended or adjusted under 35 U.S.C. 154(b) by 369 days.

(21) Appl. No.: 13/262,108

(22) PCT Filed: Oct. 20, 2010

(86) PCT No.: PCT/LV2010/000014
§ 371 (c)(1),
(2), (4) Date: Sep. 29, 2011

(87) PCT Pub. No.: WO2011/053103
PCT Pub. Date: May 5, 2011

(65) Prior Publication Data
US 2012/0021206 A1      Jan. 26, 2012

(30) Foreign Application Priority Data

Oct. 26, 2009  (LV) ..................................... P-09-186

(51) Int. Cl.
| | | |
|---|---|---|
| C04B 14/48 | (2006.01) | |
| C04B 14/36 | (2006.01) | |
| C04B 28/04 | (2006.01) | |
| C04B 22/00 | (2006.01) | |
| C04B 103/56 | (2006.01) | |
| C04B 111/34 | (2006.01) | |
| C04B 111/60 | (2006.01) | |

(52) U.S. Cl.
CPC .............. *C04B 28/04* (2013.01); *C04B 22/008* (2013.01); *C04B 2103/58* (2013.01); *C04B 2111/34* (2013.01); *C04B 2111/60* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 5,114,487 A | * | 5/1992 | Gartshore et al. ............ 106/695 |
| 2009/0305019 A1 | * | 12/2009 | Chanvillard et al. ......... 428/220 |

FOREIGN PATENT DOCUMENTS

| | | |
|---|---|---|
| BE | 905 741 A1 | 3/1987 |
| EP | 0 137 024 B1 | 4/1985 |
| EP | 0 350 365 A1 | 1/1990 |
| EP | 0 737 787 A1 | 10/1996 |
| FR | 2 684 397 A1 | 6/1993 |
| KR | 100 755 423 B1 | 9/2007 |

OTHER PUBLICATIONS

PrimeComposite Flooring System, Primekss Ultra Floor, India Case Study, Sep. 2014, p. 4.*
Primekss PrimeComposite Slab on grade, downloaded May 4, 2015.*
Shrinkage Resistant Slabs, Concrete Construction, Jan. 2013.*
International Search Report from PCT/LV2010/000014 dated Apr. 14, 2011 (3 pages).

* cited by examiner

*Primary Examiner* — Monique Jackson
(74) *Attorney, Agent, or Firm* — Osha Liang LLP

(57) ABSTRACT

The invention is in the field of construction and can be used for constructing industrial floors and foundation slabs. The offered composite concrete mixture, comprising cement, sand-stone mixture, water, plasticizer, nano-size pozzolans, shrinkage reducing additive, and steel and/or synthetic fibers, allows the construction of thin, completely jointless without limitation of area, large composite concrete slabs, with no observable shrinkage cracks or curling.

9 Claims, No Drawings

COMPOSITE CONCRETE FOR FLOOR SLABS AND RAFTS

CROSS-REFERENCE TO RELATED APPLICATIONS

The present application claims priority from International Application No. PCT/LV2010/000014, filed Oct. 20, 2010. The contents of the priority application are hereby incorporated by reference in their entirety.

BACKGROUND OF INVENTION

1. Field of the Disclosure

The invention relates to construction and can be used for the construction of industrial floors and rafts.

2. Description of the Related Art

Concrete floors are either made of plain or reinforced concrete. The amount of reinforcement, or lack thereof, is in general dictated by the anticipated loads and loading intensities, and it can also be stated that a thicker slab of plain concrete can perform as satisfactorily as a thinner reinforced concrete floor.

Another reason for reinforcing concrete is to control the cracking of concrete caused by restrained shrinkage, flexural moments, plastic settlement of the ground, and punching-out of point loadings.

In order to reduce the incidence of cracking and width of cracks, it is usual to divide concrete floors into adjacent smaller slabs so that a proportion of the shrinkage contraction movement can be concentrated and located in the joints rather than the formation of undesirable cracks. Joints are of various types such as sawn cuts at 5 m to 15 m distance apart in each direction, or full depth construction joints.

Joints in concrete floors are designed in the expectation that they will open over time. Shrinkage can cause joints to open significantly and curling may be observed at the edges of the slab if shrinkage is greater in the surface layers than underneath. The thinner the slab is, the quicker and earlier it will curl, causing crumbling of the joint edges, and increasing the likelihood of damage to equipment traversing the floor.

The reinforcing of concrete floors may consist of rebars of steel wire mesh placed in a single layer, two layers or even more, depending on the type of application.

The reinforcing of concrete floors may also be obtained by randomly mixing fibers into the concrete. The fibers may consist of steel wire or steel cuttings, or of synthetic fibers or sometimes both types of fibers together, and with or without meshes and rebars. The benefit of using fibers is in their capability to better control cracking, and in a simpler slab construction, as the need for placement of rebars or meshes can be eliminated in most cases.

The introduction of steel fibers into composite concrete can reduce cracking in industrial floors and foundation slabs. According to the literature, a steel fiber dosage rate of 40 kg per cubic meter of composite concrete can reduce free shrinkage by up to 15%.

Steel fibers, thanks to their ability to better control concrete cracking, have been used during the past 25 years only as reinforcing in joint-free concrete floors of slab size not exceeding 3500 m² without joints, in accordance with best practice. However, neither shrinkage nor cracking is eliminated in these applications.

The closest prior art for the proposed invention is the composition of composite concrete for floor slabs as described in patent EP0137024. The known composite concrete contains cement, water, sand-stone mixture, naphthalene melamine sulfonate solution, and steel fibers with a diameter of 1 mm and a length of 60 mm. The ingredients content in 1 m³ of composite concrete comprises:

| | |
|---|---|
| cement | 310 kg; |
| water | 155 kg; |
| sand-stone mixture with particle size to 16 mm | 1550 kg; |
| sand-stone mixture with particle size 16-25 mm | 390 kg; |
| naphthalene melamine sulfonate solution | approx. 1.2% of cement mass, |
| steel fibers of diameter 1 mm and length of 60 mm | 30 kg. |

The design and construction of slabs placed using the prior art composite concrete composition is described in several technical standards from various countries, including, for example ACI 360 (USA), TR34 (UK), CUR36 (Holland), CUR 111 (Holland), ACI223 (USA), ACI544 (USA). However, it has been shown in practice that slabs using the prior art composite concrete composition possess the following deficiencies: limited size of composite concrete slab because of long-term cracking and curling of edges of the floor slab, joint opening, and relatively high consumption of cement because the slab must be placed to a thickness of at least 15 cm.

SUMMARY OF INVENTION

In accordance with one or more embodiments of the claimed invention a composition for composite concrete floor slabs and rafts is provided. The composition contains cement, water, sand-stone mixture with particle size to 16 mm, fibers and plasticizer, characterized in that it additionally contains at least one shrinkage reducing additive chosen from a group comprising free lime, ethylene glycol and calcium sulfoaluminate. The ingredients content in a 1 m³ of composite concrete includes:

| | |
|---|---|
| cement | 240-360 kg; |
| water | 110-165 kg; |
| sand-stone mixture with particle size to 16 mm | 1700-1900 kg; |
| plasticizer | 0.5-2% of the cement content; |
| shrinkage reducing additive or additives | 5-70 kg; |
| steel and/or synthetic fibers | 0.6-60 kg. |

Other aspects and advantages of the invention will be apparent from the following description and the appended claims.

DETAILED DESCRIPTION

The purpose of the present invention is to provide the possibility of placing a composite concrete floor slab and foundation raft slab which is thin, fully jointless without limitation of area, free of shrinkage cracks, and without edge curling. Floor slabs combining such thickness and properties are previously unknown.

The known composite concrete composition for floor slabs and rafts, containing cement, water, sand-stone mixture with particle size to 16 mm, fibers, plasticizer, is supplemented in accordance with the present invention, by the addition of at least one shrinkage-reducing additive mixed in, chosen from a group comprising free lime, ethylene glycol and calcium sulfoaluminate, hereto the ingredients content in 1 m³ of composite concrete comprises:

| | |
|---|---|
| cement | 240-360 kg; |
| water | 110-165 kg; |
| sand-stone mixture with particle size to 16 mm | 1700-1900 kg; |
| plasticizer | 0.5-2% of cement content; |
| shrinkage reducing additive or additives | 5-70 kg; |
| steel and/or synthetic fibers | 0.6-60 kg. |

It has been experimentally determined that CEMI, CEMII or CEMIII type cement should be used, and it should contain at least 75% of clinker. Shrinkage reducing additive is mixed in to compensate for shrinkage in the composite concrete and to avert shrinkage stresses. It has been experimentally proven that precisely the proposed composite concrete composition offers the possibility of placing a composite concrete floor slab which is thin, fully jointless without limitation of area, with no observable shrinkage cracks or edge curling.

The plasticizer may be selected from a group which includes naphthalenes, melamines, naphthalene-melamines, lignosulfonates or polycarboxylates. In addition, nanosize pozzolanic dust can be mixed into the composite concrete composition. The ingredients content in 1 m³ of composite concrete comprises:

| | |
|---|---|
| cement | 240-360 kg; |
| water | 110-165 kg; |
| sand-stone mixture with particle size to 16 mm | 1700-1900 kg; |
| plasticizer | 0.5-2% of cement content; |
| shrinkage reducing additive or additives | 5-70 kg; |
| fibers | 0.6-60 kg; |
| nano-size pozzolanic dust | 5-15 kg. |

The nano-size pozzolanic dust in composite concrete fully fills the gaps between the cement and sand-stone particles, resulting in a more homogeneous composite concrete.

The steel fibers of diameter 0.75-1 mm and aspect ratio 50-70 can be mixed in composite concrete. The content of steel fibers per 1 m³ of composite concrete is 25-60 kg.

Use of steel fibers in composite concrete ensures the slab's load carrying capacity and crack stability. The aspect ratio 50-70 has been selected because it is easier to introduce such fibers into the composite concrete.

Synthetic fibers of diameter 2000 dn can be mixed into the composite concrete. The content of synthetic fibers per 1 m³ of composite concrete is 0.6-4 kg.

The use of synthetic fibers in composite concrete ensures the slab's resistance to micro-cracking. Such a composition of composite concrete can be used for slabs in structures subject to light loads.

Steel fibers of diameter 0.75-1 mm and aspect ratio 50-70, and synthetic fibers of diameter 2000 dn can be mixed together into composite concrete, hereto the content of fibers per 1 m³ composite concrete comprises:

| | |
|---|---|
| Steel fibers of diameter 0.75-1 mm and aspect ratio 50-70 | 30-50 kg; |
| Synthetic fibers of diameter 2000 dn | 0.6-4 kg. |

The simultaneous use of steel and synthetic fibers in composite concrete ensures the slab's load carrying capacity and stability against macro and micro cracking.

It is further an object of the present invention to provide a monolithic floor slab, which is placed on the sub base using the patentable composition of composite concrete.

The object of the present invention is to provide a monolithic composite concrete floor slab with a thickness at least 50 mm, which is fully jointless without limitation of area (technologically the area is unlimited) and with at least 1000 J of energy absorption, determined in accordance with SIA 162, and zero shrinkage after 150 days of curing.

Also proposed is a monolithic raft slab, which is poured on a base using the patentable composition of composite concrete.

Also being patented is a monolithic composite concrete raft slab with a thickness of at least 50 mm, which is fully jointless without limitation of area (technologically the area is unlimited) and with at least 1000 J of energy absorption, determined in accordance with SIA 162, and zero shrinkage after 150 days of curing.

In the past, it has not been possible to construct such thin composite concrete floor and raft slabs, having such a high energy absorption capacity and with shrinkage practically eliminated, in fully jointless, technologically unlimited areas.

Several examples of implementation of the proposed invention are provided below. Others are also possible.

EXAMPLE 1

The composition of composite concrete for a 120 mm floor slab comprises a cement CEMII, sand-stone mixture with particle size to 16 mm, water, plasticizer: naphthalene-melamine, nano-size pozzolanic dust, shrinkage reducing additive: ethylene glycol, steel fibers of diameter 0.75 mm and length 50 mm and synthetic fibers of diameter 2000 dn and length 15 mm, with an ingredients content per 1 m³ of composite concrete comprising, in kg:

| | |
|---|---|
| cement CEMII | 330; |
| sand-stone mixture with particle size up to 16 mm | 1800; |
| water | 140; |
| naphthalene-melamine | 2; |
| nano-size pozzolanic dust | 10; |
| ethylene glycol | 5; |
| steel fibers of diameter 0.75 mm and length 50 mm | 25; |
| synthetic fibers of diameter 2000 dn and length 15 mm | 2. |

The procedure for mixing the composite concrete is as follows. To obtain 1 m³ of composite concrete, mix 330 kg of cement CEMII, 1800 kg of sand-stone mixture with particle diameter to 16 mm and 130 kg of water and obtain concrete (such concrete can be ordered and delivered from most concrete ready-mix plants). On the site where the floor or raft slabs will be placed, separately mix a slurry of 2 kg (0.61% of cement volume) of powdered naphthalene-melamine, 10 kg nano-size pozzolanic dust, 5 kg ethylene glycol and 10 kg of water, and add the resulting mixture to the prepared (or delivered) previously mixed concrete. At the time of adding the slurry mixture to the concrete, the truck drum is to rotate with a minimum speed of 12 revolutions per minute. Total mixing time is at least 1 minute for 1 m³ of concrete. Then 25 kg of steel fibers with a diameter of 0.75 mm and a length of 50 mm and 2 kg of synthetic fibers with a diameter of 2000 dn and length of 15 mm are added to the concrete. While the fibers are being added to the concrete, the drum rotates with a minimum speed of 12 revolutions per minute. Total mixing time is at least 1 minute for 1 m³ of composite concrete. The final workability class is F5 or F6. Samples of the composite concrete are to be taken on site, and are then tested in accordance with Swiss Standard SIA162 to determine the bending-punching parameters.

The composite concrete slab of thickness 120 mm is placed and finished in accordance with best practice. Sub-base requirements: plate bearing test in accordance with Westergaard—not less than 0.08 N/mm² and levelness with tolerance ±5-10 mm. The composite concrete slab area without joints is without limitation. The floor slab can be constructed over the entire area irrespective of size. After placing and finishing, curing of the composite concrete slab is necessary, using water in accordance with best practice.

It has been demonstrated experimentally that the resulting 120 mm thick monolithic jointless composite concrete slab has the following parameters:
- ultimate static point loading intensity at center, furthest from the joints: 900 kN;
- ultimate/maximum static point loading intensity on the free edge: 500 kN so that in service condition such a slab is able to resist a sustained 200 kN point loading intensity at any point on the slab, thus placing it in the "heavy-duty" class;
- maximum service loading intensity of 40 kN/m² and back to back rack legs of 120 kN total;
- maximum load on forklift truck axle of 50 kN.

It has been experimentally shown that the total energy of rupture at 25 mm deflection is at least 1000 J (tested in accordance with the Swiss Standard SIA162), and the shrinkage of composite concrete samples at 50% relative humidity and 20° C. is 0 after 150 days of hardening in a climate chamber (determined in accordance with U.S. standard ASTM C157).

EXAMPLE 2

The composition of composite concrete in a placed light-load floor slab comprises cement CEMII, sand-stone mixture with particle size to 16 mm, water, plasticizer-polycarboxylate, shrinkage reducing additive: free lime, and synthetic fibers with diameter 2000 dn and length 15 mm. The ingredients content in 1 m³ of composite concrete comprises, kg:

| | |
|---|---|
| cement CEMII | 280; |
| sand-stone mixture with particle size to 16 mm | 1900; |
| water | 150; |
| polycarboxylate | 1.5; |
| free lime | 50; |
| synthetic fibers of diameter 2000 dn and length 15 mm | 4. |

The mixing of the composite concrete and placing of the composite concrete floor slab is the same as for Example 1.

The composite concrete described is suitable for the construction of a composite concrete slab for use in commercial areas where loadings do not exceed 20 kN/m² and point load is less than 25 kN.

Sub-base bearing capacity must be at least 0.03 N/mm².

By calculating in accordance with the Standard SIA162, and by experiment, it has been determined that the minimum thickness of the composite concrete slab for a low-load bearing floor is 50 mm (instead of 125-150 mm as designed previously).

A composite concrete floor slab 50 mm thick is fully jointless, without limitation of area (technologically the area is unlimited); with energy absorption of at least 1000 J, determined in accordance with SIA162, and zero shrinkage after 150 days of hardening.

EXAMPLE 3

The composition of composite concrete for placement of a raft slab comprises cement CEMI, sand-stone mixture with particle size to 16 mm, water, plasticizer: lignosulfonate, shrinkage reducing additive: ethylene glycol, and steel fibers of diameter 1 mm and length 60 mm. The 1 m³ of composite concrete comprises, kg:

| | |
|---|---|
| cement CEMI | 300; |
| sand-stone mixture with particle size to 16 mm | 1850; |
| water | 140; |
| lignosulfonate | 3; |
| ethylene glycol | 10; |
| steel fibers of diameter 1 mm and length 60 mm | 50. |

The mixing of the composite concrete and placing of the composite concrete raft footing slab is the same as in Example 1.

It is possible to construct a composite concrete raft slab as described to a thickness of 220 mm. It is possible to build load bearing columns on the composite concrete raft slab at 3 meter spacing.

A composite concrete raft slab 220 mm thick is fully jointless without limitation of area (technologically the area is unlimited), providing at least 1000 J of energy absorption determined in accordance with SIA 162, and zero shrinkage after 150 days of hardening.

EXAMPLE 4

The composition of composite concrete for placement of a 70 mm floor slab comprises cement CEMIII, sand-stone mixture with particle size to 16 mm, water, naphthalene plasticizer, shrinkage reducing additive: ethylene glycol, and steel fibers of diameter 0.8 mm and length 50 mm. The ingredients content in 1 m³ of composite concrete comprises, kg:

| | |
|---|---|
| cement CEMIII | 320; |
| sand-stone mixture with particle size up to 16 mm | 1890; |
| water | 160; |
| naphthalene | 4; |
| ethylene glycol | 12; |
| steel fibers with diameter 0.8 mm and length 50 mm | 30. |

The mixing of the composite concrete and placing of the composite concrete floor slab is the same as in Example 1.

The composite concrete floor slab 70 mm thick is fully jointless without limitation of area (technologically the area is unlimited), providing at least 1000 J of energy absorption determined in accordance with SIA 162, and zero shrinkage after 150 days of hardening.

EXAMPLE 5

The composition of composite concrete for placement of a 100 mm floor slab comprises a cement CEMII, sand-stone mixture with particle size to 16 mm, water, melamine plasticizer, shrinkage reducing additives: free lime and calcium sulfoaluminates, steel fibers of diameter 1 mm and length 50 mm, and synthetic fibers of diameter 2000 dn and length 15 mm. The ingredients content in 1 m³ of composite concrete comprises, kg:

| | |
|---|---|
| cement CEMII | 310; |
| sand-stone mixture with particle size up to 16 mm | 1900; |
| water | 140; |
| free lime | 30; |
| calcium sulfo aluminate | 40; |
| melamine | 3; |

-continued

| | |
|---|---|
| steel fibers of diameter 1 mm and length 50 mm | 40; |
| synthetic fibers with diameter 2000 dn and length 15 mm | 1. |

The mixing of the composite concrete and placing of the composite concrete floor slab is the same as in Example 1.

The composite concrete floor slab 100 mm thick is fully jointless without limitation of area (technologically the area is unlimited), providing at least 1000 J of energy absorption determined in accordance with SIA 162, and zero shrinkage after 150 days of hardening.

EXAMPLE 6

The composition of composite concrete for placement of a 130 mm floor slab comprises the cement CEMII, sand-stone mixture with particle size to 16 mm, water, plasticizer polycarboxylate, shrinkage reducing additives: free lime and ethylene glycol and steel fibers of diameter 0.8 mm and length 60 mm. The ingredients content per 1 $m^3$ of composite concrete comprises, kg:

| | |
|---|---|
| cement CEMII | 360; |
| sand-stone mixture with particle size up to 16 mm | 1850; |
| water | 130; |
| free lime | 50; |
| ethylene glycol | 8; |
| polycarboxylate | 2; |
| steel fibers of diameter 0.8 mm and length 60 mm | 60. |

The mixing of the composite concrete and placing of the composite concrete floor slab is the same as for Example 1.

The composite concrete floor slab 130 mm thick is fully jointless without limitation of area (technologically the area is unlimited) providing at least 1000 J of energy absorption determined in accordance with SIA 162, and zero shrinkage after 150 days of hardening.

The invention claimed is:

1. A monolithic floor slab or monolithic raft slab having at least 1000 J of energy absorption, determined in accordance with the Swiss Standard SIA 162, and zero shrinkage after 150 days of hardening, the floor slab or raft slab made of composite concrete containing cement, water, sand-stone mixture, fibers, plasticizer, at least one shrinkage reducing additive chosen from a group consisting of free lime, ethylene glycol, and calcium sulfoaluminate, wherein the ingredients content in 1 $m^3$ of said composite concrete comprises:
   cement, being CEMI, CEMII or CEMIII cement type containing at least 75% of clinker:
      240-360 kg;
   water: 110-165 kg;
   sand-stone mixture with particle size to 16 mm: 1700-1900 kg;
   plasticizer: 0.5-2% of the cement content;
   shrinkage reducing additive or additives added in the quantity of:
      5-70 kg;
   steel fibers of diameter 0.75-1 mm and aspect ratio 50-70: 25-60 kg,
   wherein the monolithic floor slab or monolithic raft slab being fully jointless without limitation of area and the thickness of the said fully jointless monolithic floor slab or fully jointless monolithic raft slab is at least 50 mm.

2. The monolithic floor slab or monolithic raft slab according to claim 1, further comprising synthetic fibers of diameter 2000 dn, wherein the content of the synthetic fibers per 1 $m^3$ is 0.6-4 kg.

3. The monolithic floor slab or monolithic raft slab according to claim 1,
   which additionally contains nano-size pozzolanic dust, hereto the ingredients content of 1 $m^3$ of said composite concrete comprises:

| | |
|---|---|
| cement: | 240-360 kg; |
| water: | 110-165 kg; |
| sand-stone mixture with particle size to 16 mm: | 1700-1900 kg; |
| plasticizer: | 0.5-2% of the cement content; |
| shrinkage reducing additive or additives: | 5-70 kg; |
| steel fibers of diameter 0.75-1 mm and aspect ratio 50-7: | 25-60 kg; |
| synthetic fibers of diameter 2000 dn: | 0.6-4 kg; |
| nano-size pozzolanic dust: | 5-15 kg. |

4. The monolithic floor slab or monolithic raft slab according to claim 2,
   which additionally contains nano-size pozzolanic dust, hereto the ingredients content of 1 $m^3$ of said composite concrete comprises:

| | |
|---|---|
| cement: | 240-360 kg; |
| water: | 110-165 kg; |
| sand-stone mixture with particle size to 16 mm: | 1700-1900 kg; |
| plasticizer: | 0.5-2% of cement content; |
| shrinkage reducing additive or additives: | 5-70 kg; |
| steel fibers of diameter 0.75-1 mm and aspect ratio 50-70: | 25-60 kg; |
| synthetic fibers of diameter 2000 dn: | 0.6-4 kg; |
| nano-size pozzolanic dust: | 5-15 kg. |

5. The monolithic floor slab or monolithic raft slab according to claim 1, being 100 mm thick, fully jointless without limitation of area, having at least 1000 J of energy absorption, determined in accordance with the Swiss Standard SIA 162, and zero shrinkage after 150 days of hardening, wherein the ingredients content in 1 $m^3$ of said composite concrete comprises: cement, being CEMII cement type: 310 kg; water: 140 kg; sand-stone mixture with particle size to 16 mm: 1900 kg; free lime: 30 kg; calcium sulfoaluminate 40 kg; melamine 3 kg; steel fibers of diameter 1 mm and length 50 mm: 40 kg; synthetic fibers with diameter 2000 dn and length 15 mm: 1 kg.

6. The monolithic floor slab or monolithic raft slab according to claim 1, being 120 mm thick, fully jointless without limitation of area, and having at least 1000 J of energy absorption, determined in accordance with the Swiss Standard SIA 162, and zero shrinkage after 150 days of hardening, wherein the ingredients content in 1 $m^3$ of said composite concrete comprises: cement, being CEMII cement type: 330 kg; water 140 kg; sand-stone mixture with particle size to 16 mm: 1800 kg; naphthalene-melamine: 2 kg; nano-size pozzolanic dust: 10 kg; ethylene glycol: 5 kg; steel fibers of diameter 0.75 mm and length 50 mm: 25 kg; synthetic fibers of diameter 2000dn and length 15 mm: 2 kg.

7. The monolithic floor slab or monolithic raft slab according to claim 1, being 50-220 mm thick.

8. The monolithic floor slab according to claim 1, wherein said monolithic floor slab is placed on a sub base.

9. The monolithic floor slab according to claim 2, wherein said monolithic floor slab is placed on a sub base.

* * * * *